Patented May 3, 1927.

1,626,910

UNITED STATES PATENT OFFICE.

DAVID JULIAN BLOCK, OF CHICAGO, ILLINOIS, ASSIGNOR TO WILLIAM D. STEIN, OF CHICAGO, ILLINOIS.

FLOUR IMPROVER AND PROCESS OF MANUFACTURE.

No Drawing.    Application filed August 29, 1925. Serial No. 53,426.

This invention relates to a composition of matter and a process of manufacturing the same, and more particularly to a flour improver adapted for use in connection with the baking of bread and the like.

In the making of bread, cakes and other yeast-leavened bakery goods, it has heretofore been customary to add sucrose to the dough batch. The sucrose is acted upon by the yeast enzymes which break down the sucrose into monosaccharides such as dextrose, lævulose and others. The initial breaking down of the sucrose into simple or monosaccharide sugars is accomplished by the yeast enzyme invertase, but no alcoholic fermentation can take place until the cane sugar has been so reduced. The enzyme zymase then acts on the simple sugars and converts these into alcohol and carbon dioxide.

It is an object of this invention to provide a flour improver containing dextrose, lævulose or the like which may be added to flour preparatory to making the same into bread and thereby supply at the outset material for the yeast enzymes to work on; thus materially reducing the fermentation period.

It is a further object of this invention to provide a flour improver containing an acid whereby the hydrogen-ion concentration of the flour used in bread making and the like may be maintained at an optimum.

It is a further object of this invention to provide a flour improver which—when used in making bread and the like—produces a loaf having a whiter and more silky texture, a more colorful crust, a better flavor, and which reduces the fermentation period so that more and better loaves of bread and the like may be produced in any given time.

Other and further important objects of the invention will be apparent from the disclosures in the following description, which sets forth the preferred form of my invention.

In bread making and the like it is well known that before fermentation can take place the cane or beet sugar added to the flour must first be converted into simple sugars such as dextrose, lævulose and others. In preparing my new flour improver I have taken advantage of this fact and incorporated in the compound sufficient simple sugars such as dextrose, lævulose or the like to immediately provide material for the yeast enzymes to work on and so materially reduce the fermentation period. It is further known that the fermentation of sugars as well as the imbibition of gluten during the bread making process are affected by the concentration of the hydrogen-ion. The hydrogen-ion of a normal bread dough, when mixed, is very approximately that of the flour, usually slightly higher, and in the case of ordinary flour varies from a pH of 6.15 to a pH of 5.16. According to a series of researches, I have found that the optimum pH for diastatic activity is never reached in the short fermentation, straight dough process, and not often in sponge doughs. Even in the latter case, the optimum pH is obtained only after six or more hours of fermentation, after which time the diastase has suffered greatly through loss of activity due to changes of hydration of the colloidal proteins.

As the fermentation advances the hydrogen-ion concentration slowly increases until an apparent maximum is reached at approximately pH 5.4 to 5.2, when the dough is ready for the oven. I have determined by experiment that the diastatic activity of wheat flour reaches a maximum at pH 4.7 to pH 4.8 and I have added to my flour improver sufficient mild acid to almost at once bring the hydrogen-ion concentration of the flour to the optimum concentration. This has the effect of nearly doubling the amount of maltose produced per unit of time, and this maltose in turn becomes available as food for the yeast cells which thereby are enabled to renew their fermentation activity and increase the rate at which $CO_2$ is produced for the aeration of the dough.

In addition to the benefits enumerated above, the addition of the proper amount of mild acid exercises a softening effect on the gluten and increases the imbibition of gluten which suffers more or less rapid proteolysis. The gluten thereby becomes softer and less elastic so enabling the carbon dioxide, or other leavening agent, to "raise" the dough easier and more quickly.

For the sake of a concrete example illustrating one way in which my novel flour improver may be manufactured in an especially desirable form, details of a specific procedure within the scope of the broad invention will now be set forth. It is understood, however, that the invention is not limited to the precise details described but may be varied within the scope of the appended claims in which the invention is more particularly pointed out.

As a specific example, we may take 86.64 pounds of flour, starch, or other inert "filler" and place this material in a rotating drum equipped with an agitating device. Thirteen pounds of monosaccharide, preferably anhydrous corn sugar, is now added under constant agitation and the mixing is continued until a thoroughly homogeneous mixture is attained. I next add 0.36 pounds of lactic acid to the mass by means of an atomizing device or, by any other means, and I again agitate the mix until a uniform and homogeneous mixture is attained. The product may now be passed through a sieve of fine bolting silk, whereupon it is ready for commerical use.

In the foregoing I have used anhydrous corn sugar, lactic acid and flour; but I do not wish to confine myself to these particular products, as other acids, such as hydrochloric acid, are equally available; nor do I wish to limit my invention to the use of corn sugar, as other hexose or mono-saccharide sugars may be used with good results. Obviously, almost any pulverulent food product may be substituted for the flour.

My improved product is a substantially colorless and odorless, amorphorus, powder having a slightly acid, sweet taste. In baking it is added to the flour in quantities varying from 5% when a very soft wheat flour is used, to 25% with the harder and more glutinous flours, but in either event the hydrogen-ion concentration of the flour must be predetermined and sufficient of my novel bread and flour improver added to bring the pH to approximately 4.8.

I am aware that numerous details of the process may be varied through a wide range without departing from the spirit of this invention, and do not desire limiting the patent granted otherwise than as necessitated by the prior art.

I claim as my invention:

1. A flour improver consisting of substantially eighty-seven per cent inert material, thirteen per cent anhydrous corn sugar and approximately four-tenths per cent of a non-injurious acid.

2. In the process of bread making, the step of adding to the flour a monosaccharide to provide immediate food for the yeast to work upon and a non-injurious acid in sufficient quantity to bring the pH of the flour mix to substantially 4.8, whereby the optimum condition of acid concentration for diastatic activity may be obtained practically immediately.

3. A flour improver comprising as its essential ingredients principally a monosaccharide and a non-injurious acid.

4. A flour improver comprising as its essential ingredients substantially pure dextrose and a relatively small quantity of an acid innocuous to the human system in the quantity present.

5. The process of making bread and the like, which includes mixing with the flour substantially pure dextrose and a non-injurious acid, the acid being present in sufficient quantity to bring the hydrogen-ion concentration of the flour mix to approximately 4.8.

In testimony whereof I have hereunto subscribed my name.

DAVID JULIAN BLOCK.